(12) United States Patent
Boelstler

(10) Patent No.: US 8,430,371 B2
(45) Date of Patent: Apr. 30, 2013

(54) QUICK RELEASE HOOK AND LOOP DEVICE

(76) Inventor: Steven G. Boelstler, Roseville, MI (US)

(*) Notice: Subject to any disclaimer, the term of this patent is extended or adjusted under 35 U.S.C. 154(b) by 29 days.

(21) Appl. No.: 13/224,441

(22) Filed: Sep. 2, 2011

(65) Prior Publication Data
US 2013/0056597 A1 Mar. 7, 2013

(51) Int. Cl.
*A47F 1/14* (2006.01)
(52) U.S. Cl.
USPC ............ 248/467; 248/205.2; 248/205.3
(58) Field of Classification Search ......... 248/205.2, 248/205.3, 467, 475.1, 489, 683, 690
See application file for complete search history.

(56) References Cited

U.S. PATENT DOCUMENTS

| | | | | |
|---|---|---|---|---|
| 3,856,249 A * | 12/1974 | Frye | ............................ | 248/205.3 |
| 4,067,532 A * | 1/1978 | Viteretto | ...................... | 248/683 |
| 4,310,137 A * | 1/1982 | Frye | ............................ | 248/467 |
| 4,678,690 A * | 7/1987 | Palmer et al. | .................. | 428/31 |
| 5,185,909 A * | 2/1993 | Inagaki | ...................... | 24/585.12 |
| 6,001,471 A * | 12/1999 | Bries et al. | .................... | 428/343 |
| 6,004,642 A * | 12/1999 | Langford | ..................... | 428/40.1 |
| 6,086,973 A * | 7/2000 | Hazes | ......................... | 428/40.1 |
| 6,162,534 A * | 12/2000 | Hamerski | ..................... | 428/354 |
| 6,350,502 B1 * | 2/2002 | Grosskopf et al. | ........... | 428/40.1 |
| 6,406,781 B1 * | 6/2002 | Hamerski | ................. | 428/317.3 |
| 6,506,467 B2 * | 1/2003 | Grosskopf et al. | ........... | 428/40.1 |
| 6,641,892 B2 * | 11/2003 | Luhmann | ....................... | 428/99 |
| 6,692,807 B2 * | 2/2004 | Bries et al. | .................... | 428/40.1 |
| 6,972,141 B1 * | 12/2005 | Bries et al. | .................... | 428/40.1 |
| 7,276,272 B2 * | 10/2007 | Mizuno et al. | ............... | 428/40.1 |

* cited by examiner

*Primary Examiner* — Gwendolyn Baxter
(74) *Attorney, Agent, or Firm* — Bejin VanOphem Bieneman PLC

(57) ABSTRACT

A quick release hook and loop device is used to attach an object to a base surface, such as a wall. It is comprised of first and second quick release sections and a strap. The quick release sections each have a nonstick side. The quick release sections are attached to each other at their nonstick sides by threading a strap through openings within the quick release sections. The other sides of the quick release sections are provided with hook or loop fastener surfaces. The device may be used to attach an object to a surface by way of hook and loop fastener bonds. The hook and loop fastener bonds may be effectively broken by removing the strap from the quick release sections.

8 Claims, 5 Drawing Sheets

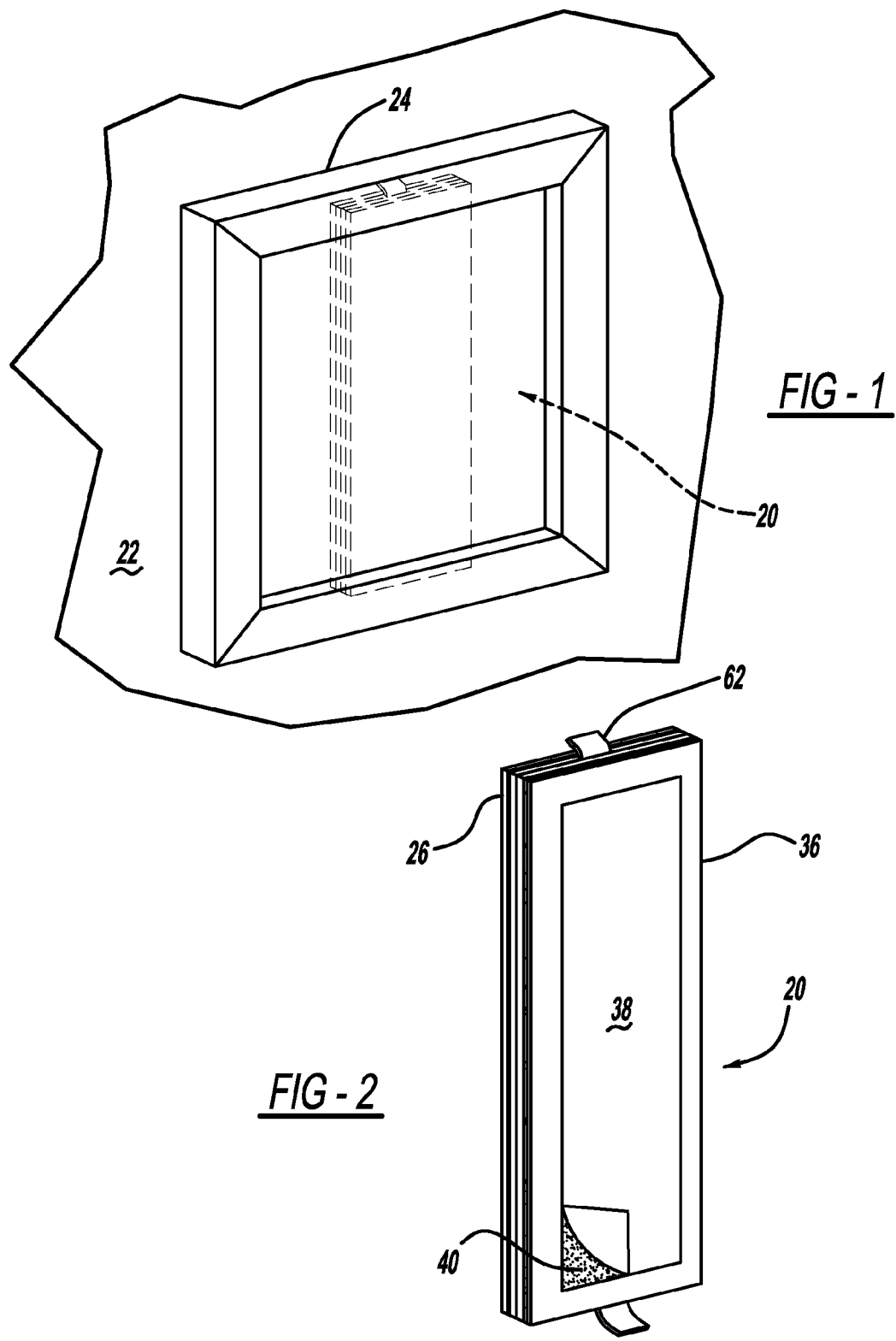

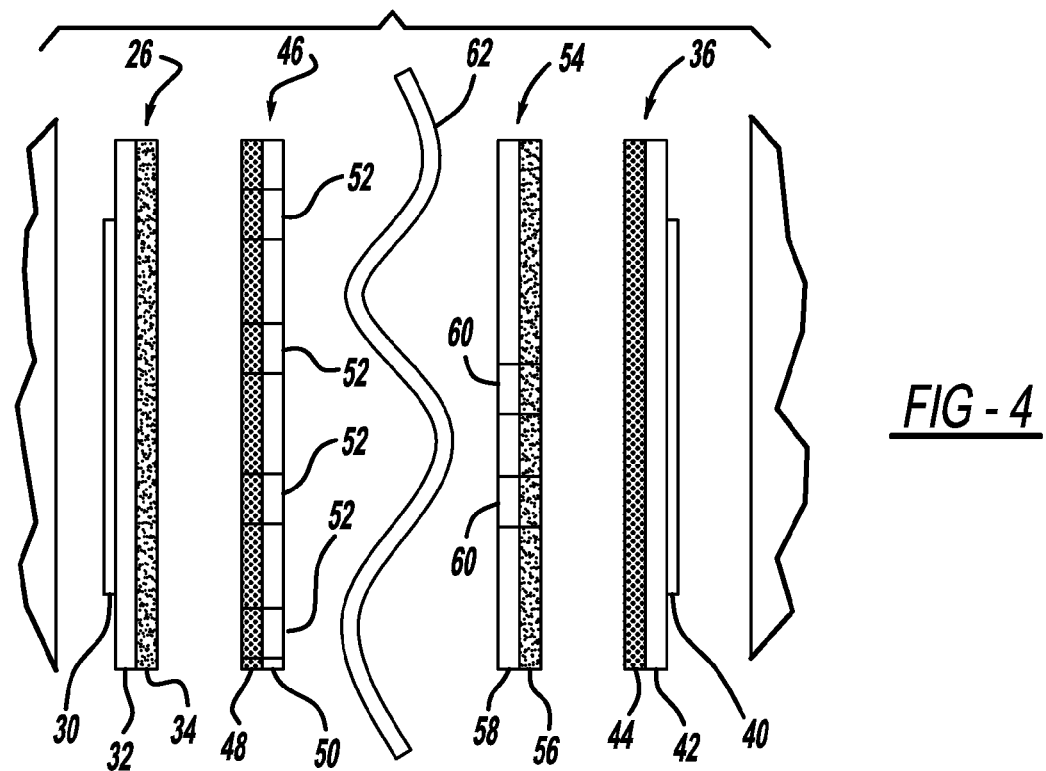
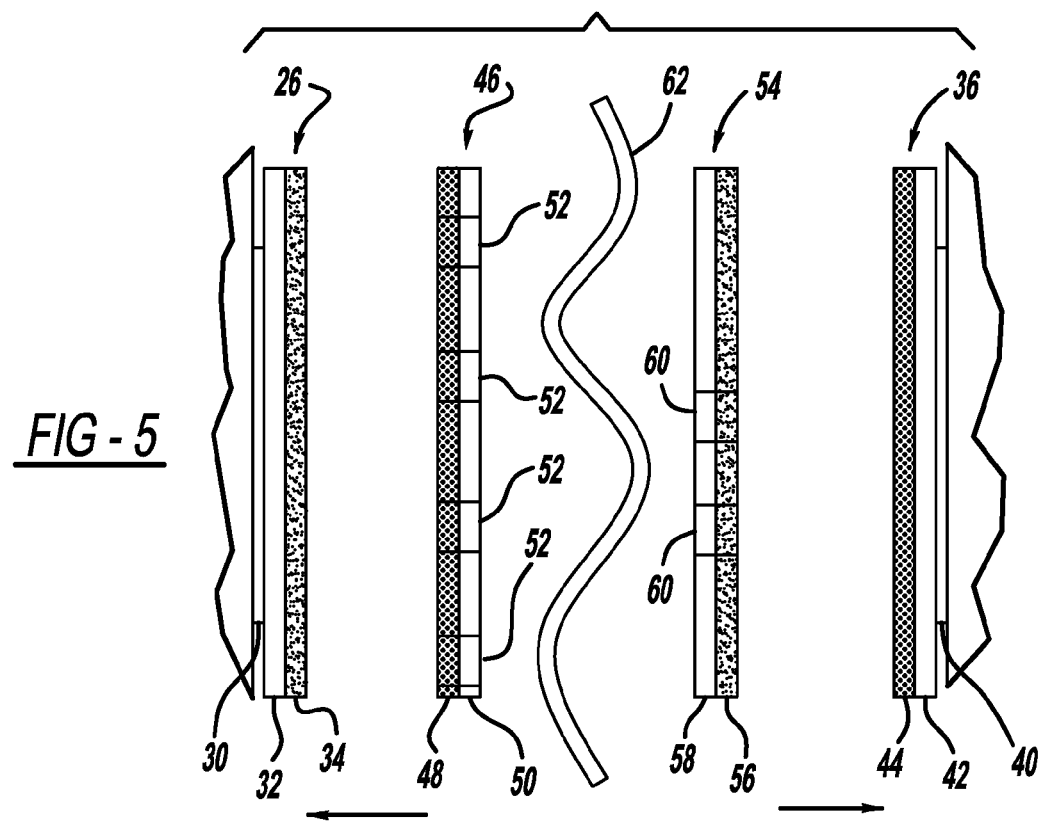

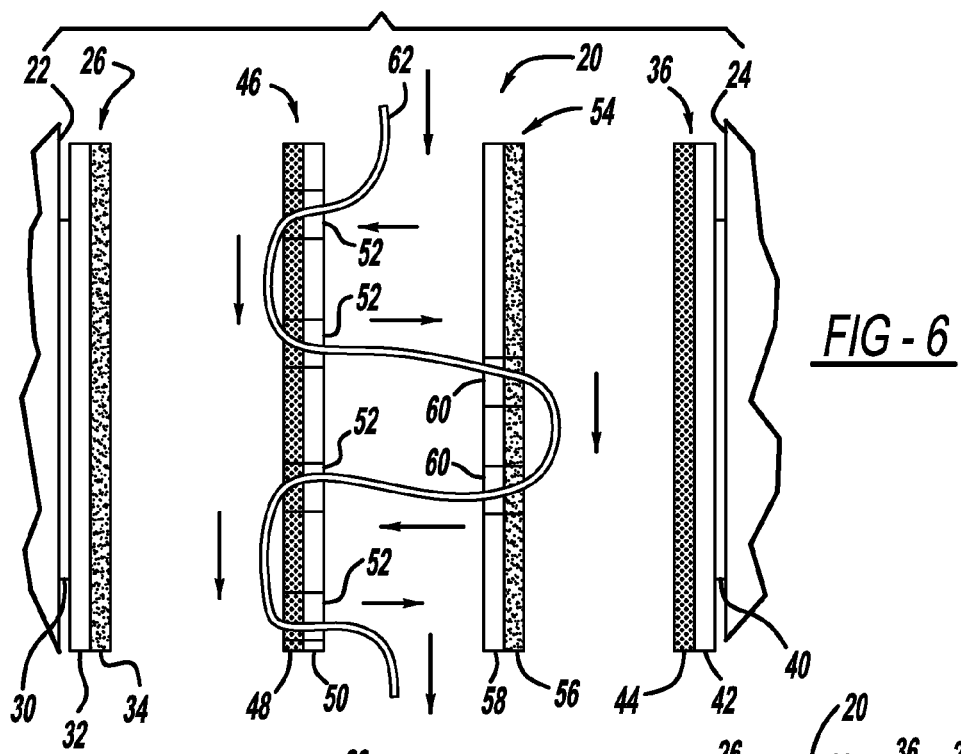
*FIG - 6*
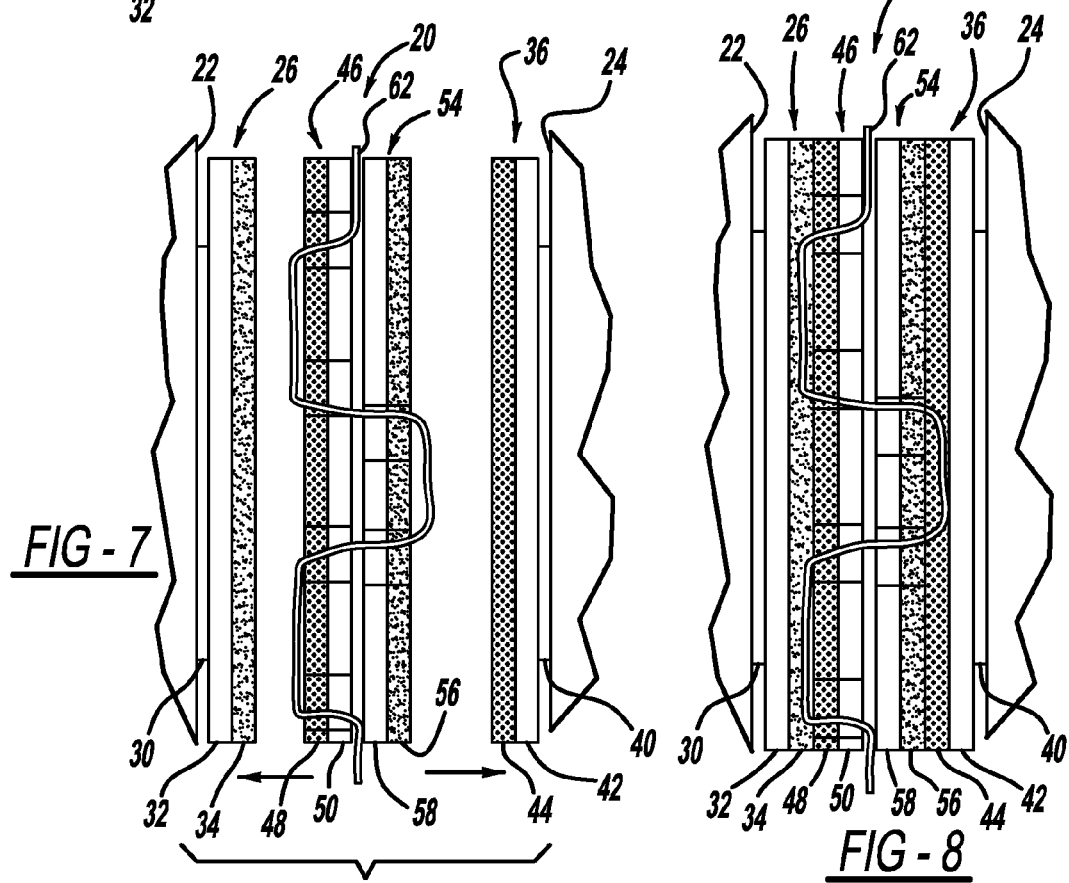
*FIG - 7*
*FIG - 8*

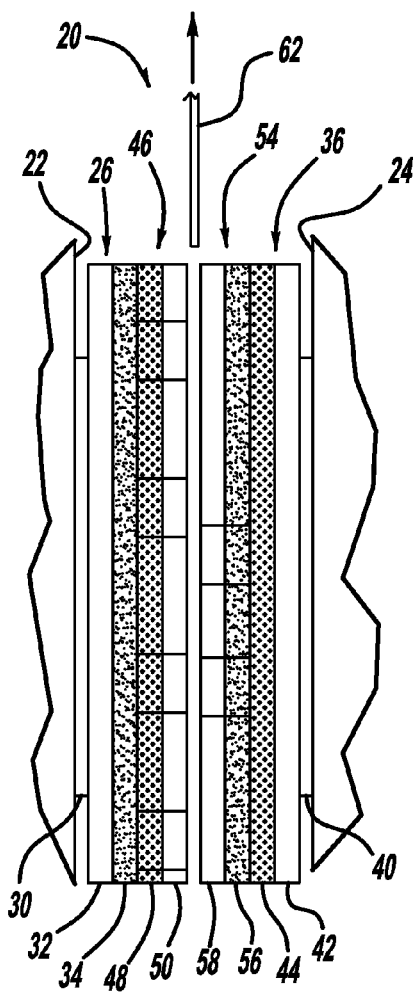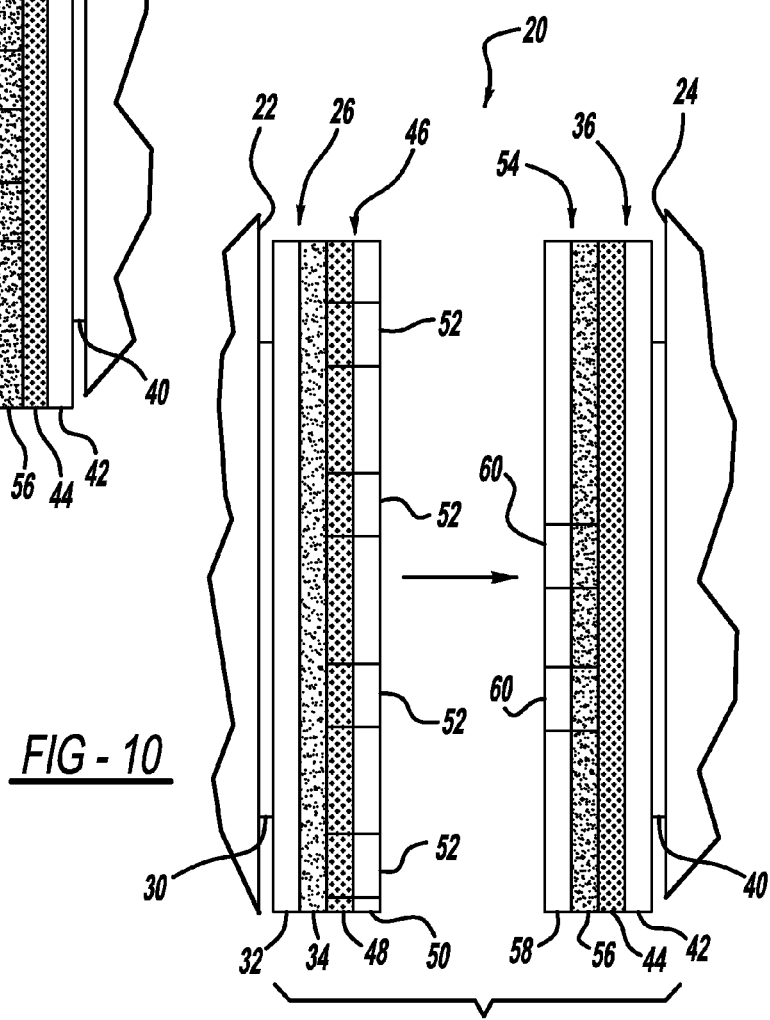
FIG - 9
FIG - 10

QUICK RELEASE HOOK AND LOOP DEVICE

BACKGROUND

Many mounting applications involve releasably attaching an object to a base surface. One example is the mounting of a picture to a wall. A second example is the mounting of an insulation panel to a wall. Many traditional mounting procedures result in the object being permanently attached to the base surface. An object may be fastened to a wall with screws or nails. It may also be fastened to a wall with an adhesive. In both situations it is difficult to remove the object from the base surface.

Hook and loop fasteners provide a partial solution to the problem of mounting an object to a base surface when it is undesirable for the bond between the object and the base surface to be a permanent bond. The base surface may be provided with a loop fastener and the object surface may be provided with hook fastener. The object is attached to the base by engaging the hook fastener with the loop fastener. Such a bond is releasable because the hook fastener may be separated from the loop fastener by applying a removal force to the object.

Hook and loop fasteners are commonly sold under the trade name Velcro. Hook and loop fasteners consist of hook sections and loop sections. The hook sections have a plurality of miniature hooks. The loop sections have a plurality of miniature loops. The hooks and loops are adapted to be releasably attached to each other. When pressed together a hook section becomes bound to a loop section. One of the primary advantages of using a hook and loop fastener to secure two objects together is that the securing bond between the hooks and the loops is releasable. When left undisturbed the hook section and the loop section remain bound to each other. However, the bond may be broken and the objects separated from each other by pulling or peeling the hook section from the loop section.

A problem arises when the attached object is rigid. Then, the object can be pulled away from the bond to break the hook and loop bond, but it cannot be peeled away from the bond because of the rigidity of the object. It is well known that the peel strength of the hook and loop bond is much weaker than the normal removal strength of the bond. The term normal refers to the direction of the removal force. When an object can be removed from a hook and loop bond only by pulling it away, rather than by peeling it away, much more removal force is required. In fact, the removal force may be so great that the base surface or the mounted object may be damaged during the process of removal. What is needed is a device that allows a rigid object to be mounted to a base surface by a hook and loop fastener bond wherein the bond may be broken by a peeling force.

SUMMARY

A quick release hook and loop device is used to attach an object, such as a picture or an insulation panel, to a base surface, such as a wall. The basic device is comprised of a first quick release section, a second quick release section and a strap. The first quick release section is typically a flexible piece of material having a nonstick backing on one side and a hook or loop fastener on the other side. The first quick release section has a plurality of openings configured to receive the strap. The first quick release section hook or loop fastener is adapted to securely mate with a hook or loop fastener on the base. For example, the base may be a wall provided with a loop fastener surface. In this case, the first quick release section hook or loop fastener would be a hook fastener in order to form a hook and loop bond with the base fastener.

The second quick release section has a similar configuration to the first quick release section. It also is typically a flexible piece of material having a nonstick backing on one side and a hook or loop fastener on the other side. The second quick release section also has a plurality of openings configured to receive the strap. The second quick release section hook or loop fastener is adapted to securely mate with a hook or loop fastener on the object to be attached. For example, the object to be attached may be a picture provided with a hook fastener surface. In this case, the second quick release section hook or loop fastener would be a loop fastener in order to form a hook and loop bond with the object fastener.

The openings on the quick release sections are configured to allow the quick release sections to be releasably attached to each other by a strap. The nonstick backings of the quick release sections are positioned back-to-back. The quick release sections are then secured to each other by the strap. The strap is threaded through the openings of the quick release sections. Thus, the strap forms a bond between the quick release sections. This bond between the quick release sections is not a hook and loop fastener bond. This bond may be broken by removing the strap from the openings of the quick release sections.

DRAWINGS

These and other features, aspects, and advantages of the present invention will become better understood with regard to the following description, appended claims, and accompanying drawings where:

FIG. 1 is a perspective view of a quick release hook and loop device attaching an object to a wall.

FIG. 2 is a perspective view of a quick release hook and loop device.

FIG. 4 is a sectional elevation view showing the separated components of a quick release hook and loop device.

FIG. 5 is a sectional elevation view of the quick release hook and loop device of FIG. 4 showing the base section of the device attached to a base surface and the mounting object section of the device attached to an object.

FIG. 6 is a sectional elevation view showing a strap being threaded through the openings of the quick release sections of the quick release hook and loop device of FIG. 4.

FIG. 7 is a sectional elevation view showing the quick release sections of FIG. 6 bonded together.

FIG. 8 is a sectional elevation view of the hook and loop device of FIG. 4 showing the first quick release section attached to the base section and the second quick release section attached to the mounting object section.

FIG. 9 is a sectional elevation view of the hook and loop device of FIG. 8 showing the strap being removed from the quick release sections of the hook and loop device.

FIG. 10 is a sectional elevation view of the hook and loop device of FIG. 9 showing the quick release sections of the hook and loop device being separated from each other.

DESCRIPTION

Figure 3:
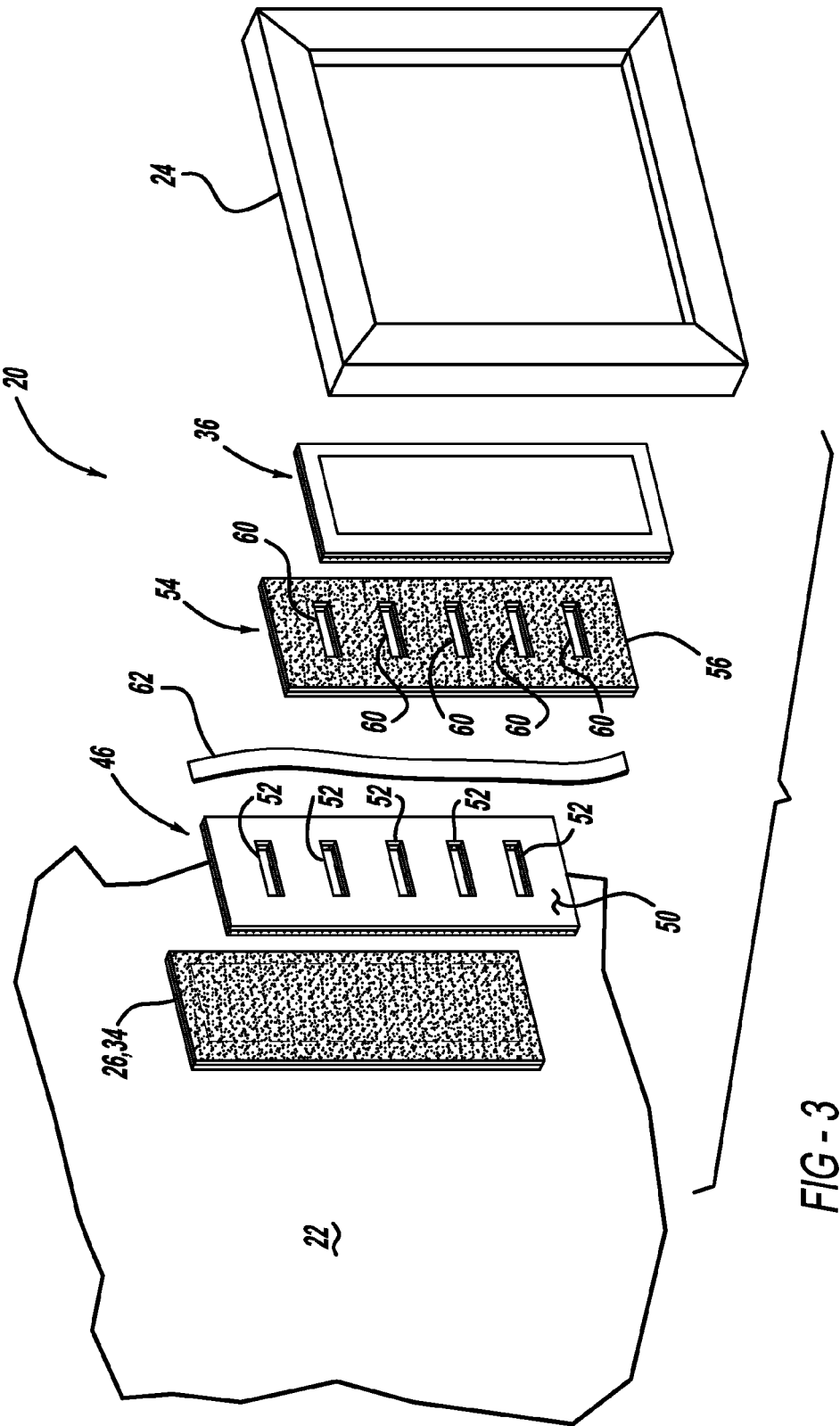
FIG. 3 is an exploded perspective view of the quick release hook and loop device attaching an object to a wall of FIG. 1.

A quick release hook and loop device 20 is used to attach an object 24 to a base surface 22. A typical base surface 22 is a wall. The wall may be the wall of a building, the wall of a vehicle or any similar type of surface. The object having the object surface 24 may be almost any object which may be attached to a base surface 22. Such objects include pictures, foam insulation and floor panels.

The quick release hook and loop device 20 uses hook and loop fasteners. Hook and loop fasteners are commonly sold under the trade name Velcro. Hook and loop fasteners consist of hook sections and loop sections. The hook sections have a plurality of miniature hooks. The loop sections have a plurality of miniature loops. The hooks and loops are adapted to be releasably attached to each other. When pressed together a hook section becomes bound to a loop section. One of the primary advantages of using a hook and loop fastener to secure two objects together is that the securing bond between the hooks and the loops is releasable. When left undisturbed the hook section and the loop section remain bound to each other. However, the bond may be broken and the objects separated from each other by pulling or peeling the hook section from the loop section. A problem arises when the attached object is rigid. Then, the object can be pulled away from the bond to break the hook and loop bond, but it cannot be peeled away from the bond because of the rigidity of the object. It is well known that the peel strength of the hook and loop bond is much weaker than the normal removal strength of the bond. The term normal refers to the direction of the removal force. When an object can be removed from a hook and loop bond only by pulling it away, rather than by peeling it away, much more removal force is required. In fact, the removal force may be so great that the base surface or the mounted object may be damaged during the process of removal. What is needed is a device that allows a rigid object to be mounted to a base surface by a hook and loop fastener bond wherein the bond may be broken by a peeling force. The quick release hook and loop device 20 described herein satisfies this need.

The preferred embodiment of a quick release hook and loop device 20 is comprised of a base section 26, a mounting object section 36, a first quick release section 46, a second quick release section 54 and a strap 62. The primary element of the base section 26 is a hook or loop fastener 34. Preferably, the fastener is a loop fastener 34. The reason for this is that the base section 26 fastener 34 will often be subject to unintentional contact. A loop fastener has less of a tendency to attached to an extraneous object than a hook fastener. The quick release hook and loop device 20 is not limited to unique associations of hook or loop fasteners to various parts of the device 20. What is important is that it be recognized that to form a bond a hook fastener must be attached to a loop fastener. In other words, hook fasteners normally do not bond to other hook fasteners and loop fasteners do not normally bond to other loop fasteners. For example, FIG. 6 shows a configuration of the device 20 wherein four fastener sections are shown. From left to right they are a loop fastener 34, a hook fastener 48, a loop fastener 56 and a hook fastener 44. FIG. 6 also shows two bonding interfaces. The first bonding interface is between the base section 26 illustrated with a loop fastener 34 and the first quick release section 46 illustrated with a hook fastener 48. The second bonding interface is between the second quick release section 54 and the mounting object section 36. There, the second quick release section 54 has a loop fastener 56, while the mounting object section 36 has a hook fastener 44. It is important to understand that each bonding interface must be comprised of a hook fastener and a loop fastener, but that the physical order of the fasteners may be interchanged. For these reasons the fasteners described herein are often described as hook or loop fasteners. This means that either a hook fastener or a loop fastener may be used so long as it makes it a bonding interface with the other type of hook or loop fastener.

The base section 26 has a hook or loop fastener 34 on one side. It may consist of a piece of loop fastener 34 sewed onto a nonstick backing 32. A loop fastener 34 is preferred because it does not tend to stick to unintentionally contacted objects. The base section 26 will typically be attached to a wall. Thus an adhesive 30 may be placed on the side of the base section 26 opposite the loop fastener 34 side. The adhesive 30 is used to attach the base section to a wall. The adhesive 30 may be covered with an optional peel and stick cover. This will allow the base section 26 to be conveniently handled without the user encountering the adhesive 30. When the adhesive 30 needs to be exposed in order to attach the base section 26, the peel and stick cover is removed.

The mounting object section 36 has a hook or loop fastener 44 on one side. Preferably, the fastener is a hook fastener 44. This will allow the mounting object section 36 to be directly bonded to the base section 26 if so desired. The mounting object section may consist of a piece of hook fastener 44 sewed onto a nonstick backing 42. The mounting object section 36 will typically be attached to the surface of an object 24. Such objects include pictures, floor panels, and insulation panels. An adhesive 40 may be placed on the side of the mounting object section 36 opposite the hook fastener 44 side. The adhesive 40 is used to attach the mounting object section 36 to an object. The adhesive 40 may be covered with an optional peel and stick cover 38. This will allow the mounting object section 36 to be conveniently handled without the user encountering the adhesive 40. When the adhesive 40 needs to be exposed in order to attach the mounting object section 36, the peel and stick cover 38 is removed. A typical peel and stick cover 38 is shown in FIG. 2. This peel and stick cover 38 is shown on the mounting object section 36. The peel and stick cover on the base section 26 is of a similar configuration.

It should be understood that the base section 26 and the mounting object section 36 are optional elements of the quick release hook and loop device 20. This is because the quick release hook and loop device 20 may be used to attach an object to a surface when the object and the surface are already equipped with mating hook and loop fasteners.

The first quick release section 46 has a nonstick backing 50 on one side. The other side is provided with a hook or loop fastener 48. Preferably, the fastener is a hook fastener 48 for the reasons previously stated. The first quick release section 46 also has a plurality of openings 52. The first quick release openings 52 are configured to receive a strap 62, as shown in FIG. 4 and FIG. 6. The first quick release section 46 hook or loop fastener 48 is adapted to securely mate with the base section 26 hook or loop fastener 34. This means that one must be a hook fastener and the other must be a loop fastener.

The second quick release section 54 has a nonstick backing 58 on one side. The other side is provided with a hook or loop fastener 56. Preferably, the fastener is a loop fastener for the reasons previously stated. The second quick release section 54 also has a plurality of openings 60. The second quick release openings 60 are configured to receive the strap 62, as shown in FIG. 4 and FIG. 6. The second quick release section 54 hook or loop fastener 56 is adapted to securely mate with the mounting object section 36 hook or loop fastener 44. This means that one must be a hook fastener and the other must be a loop fastener.

The openings 52, 60 on the quick release sections 46, 54 are configured to allow the quick release sections 46, 54 to be releasably attached to each other by the strap 62. The nonstick backings 50, 58 of the quick release sections 46, 54 are positioned back-to-back, as shown in FIG. 4. The quick release sections 46, 54 are secured to each other by the strap 62. The strap 62 is threaded through the openings 52, 60 of the quick release sections 46, 54, as shown in FIG. 6 and FIG. 7. As a result, the first quick release section 46 is bound to the second quick release section 54 by the strap 62. Note that there is no hook and loop fastener bond between the first quick release section 46 and the second quick release section 54.

The strap 62 may be fabricated from a flexible piece of material. In some applications it may be desirable to have a more rigid strap 62. In such applications the strap may be fabricated from wire or even from a rigid material.

The hook or loop fastener 48 of the first quick release section 46 is securely mated with the hook or loop fastener 34 of the base section 26. This secure mating is accomplished by engaging a loop fastener with a hook fastener.

The hook or loop fastener 56 of the second quick release section 54 is securely mated with the hook or loop fastener 44 of the mounting object section 36. This secure mating is also accomplished by engaging a loop fastener with a hook fastener.

The quick release hook and loop device 20 is used to releasably secure an object 24 to a base 22. The object 24 is securely attached to the base 22, yet the object 24 may be easily removed from the base 22, even if the base is too rigid to allow the hook and loop bonds securing the object 24 to the base 22 to be broken by a peeling action. A peeling action involves the application of a shearing force to a hook and loop bond.

The process for using the quick release hook and loop device 20 is as follows. A base having a base surface 22 is selected. For example, a wall may be selected as a base surface. An object having an object mounting surface 24 is selected. For example, a picture or a foam panel may be selected. A base section 26 having a hook or loop fastener 34 on one side is selected. The base section 26 is attached to the base surface 22 of the base. For example, the base section 26 may be attached to a wall by an adhesive 30. A mounting object section 36 having a hook or loop fastener 44 on one side is selected. The mounting object section 36 is attached to the object 24. A first quick release section 46 having a nonstick backing 50 on one side and a hook or loop fastener 48 on the other side is selected. The first quick release section 46 has a plurality of openings 52 for receiving a strap 62. The first quick release section 46 hook or loop fastener 48 is adapted to securely mate with the base section 26 hook or loop fastener 34. A second quick release section 54 having a nonstick backing 58 on one side and a hook or loop fastener 56 on the other side is selected. The second quick release section 54 has a plurality of openings 60 for receiving a strap 62. The second quick release section 54 hook or loop fastener 56 is adapted to securely mate with the mounting object section 36 hook or loop fastener 44. Note that the openings 52, 60 on the quick release sections 46, 54 are configured to allow the quick release sections 46, 54 to be releasably attached to each other by a strap 62. A strap 62 is selected. The nonstick backings 50, 58 of the quick release sections 46, 54 are positioned to back-to-back, as shown in FIG. 5. The quick release sections 46, 54 are secured to each other by threading the strap 62 through the openings 52, 60 of the quick release sections 46, 54, as shown in FIG. 6 and FIG. 7. The hook or loop fastener 48 of the first quick release section 46 is securely mated to the hook or loop fastener 34 of the base section 26, as shown in FIG. 8. The hook or loop fastener 56 of the second quick release section 54 is securely mated to the hook or loop fastener 44 of the mounting object section 36, as shown in FIG. 8.

At this point the object is mounted to the base. To remove the object from the base the strap 62 is removed from the quick release sections 46, 54. This detaches the quick release sections 46, 54 from each other, as shown in FIG. 9. The first quick release section 46 is removed from the base section 26. The second quick release section 54 is removed from the mounting object section 36.

Although the invention has been shown and described with reference to certain preferred embodiments and methods, those skilled in the art undoubtedly will find alternative embodiments and methods obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A quick release hook and loop device for attaching an object to a base surface, said device comprising:
   (a) a first quick release section having a nonstick backing on one side, a hook or loop fastener on the other side and a plurality of openings for receiving a strap, said first quick release section hook or loop fastener being adapted to securely mate with a hook or loop fastener on a base surface;
   (b) a second quick release section having a nonstick backing on one side, a hook or loop fastener on the other side and a plurality of openings for receiving the strap, said second quick release section hook or loop fastener being adapted to securely mate with a hook or loop fastener on an object to be attached;
   (c) wherein the openings on the quick release sections are configured to allow the quick release sections to be releasably attached to each other by the strap; and
   (d) a strap;
   (e) wherein the nonstick backings of the quick release sections are positioned back-to-back and the quick release sections are secured to each other by the strap being threaded through the openings of the quick release sections.

2. The quick release hook and loop device of claim 1 wherein the strap is a wire.

3. A quick release hook and loop device for attaching an object to a base surface, said device comprising:
   (a) a base section having a hook or loop fastener on one side;
   (b) a mounting object section having a hook or loop fastener on one side;
   (c) a first quick release section having a nonstick backing on one side, a hook or loop fastener on the other side and a plurality of openings for receiving a strap, said first quick release section hook or loop fastener being adapted to securely mate with the base section hook or loop fastener;
   (d) a second quick release section having a nonstick backing on one side, a hook or loop fastener on the other side and a plurality of openings for receiving the strap, said second quick release section hook or loop fastener being adapted to securely mate with the mounting object section hook or loop fastener;
   (e) wherein the openings on the quick release sections are configured to allow the quick release sections to be releasably attached to each other by the strap; and
   (f) a strap;
   (g) wherein the nonstick backings of the quick release sections are positioned back-to-back and the quick release sections are secured to each other by the strap being threaded through the openings of the quick release sections;
- (h) wherein the hook or loop fastener of the first quick release section is securely mated with the hook or loop fastener of the base section; and
- (i) wherein the hook or loop fastener of the second quick release section is securely mated with the hook or loop fastener of the mounting object section.

4. The quick release hook and loop device of claim 3 further comprising an adhesive applied to the side of the base section opposite the hook or loop fastener side of the base section and an adhesive applied to the side of the mounting object section opposite the hook or loop fastener side of the mounting object section.

5. The quick release hook and loop device of claim 4 further comprising a releasable nonstick cover covering the adhesive applied to the base section and a releasable nonstick cover covering the adhesive applied to the mounting object section.

6. The quick release hook and loop device of claim 3 wherein the strap is a wire.

7. The quick release hook and loop device of claim 3 wherein said mounting object section hook or loop fastener is adapted to securely mate with the base section hook or loop fastener.

8. A process for releasably securing an object to a base and for detaching the object from the base comprising:
- (a) selecting a base having a base surface;
- (b) selecting an object having an object mounting surface;
- (c) selecting a base section having a hook or loop fastener on one side;
- (d) attaching the base section to the base surface of the base;
- (e) selecting a mounting object section having a hook or loop fastener on one side;
- (f) attaching the mounting object section to the object;
- (g) selecting a first quick release section having a nonstick backing on one side, a hook or loop fastener on the other side and a plurality of openings for receiving a strap, said first quick release section hook or loop fastener being adapted to securely mate with the base section hook or loop fastener;
- (h) selecting a second quick release section having a nonstick backing on one side, a hook or loop fastener on the other side and a plurality of openings for receiving the strap, said second quick release section hook or loop fastener being adapted to securely mate with the mounting object section hook or loop fastener;
  - (i) wherein the openings on the quick release sections are configured to allow the quick release sections to be releasably attached to each other by the strap;
- (i) selecting a strap;
- (j) positioning the nonstick backings of the quick release sections back-to-back;
- (k) securing the quick release sections to each other by threading the strap through the openings of the quick release sections;
- (l) securely mating the hook or loop fastener of the first quick release section to the hook or loop fastener of the base section;
- (m) securely mating the hook or loop fastener of the second quick release section to the hook or loop fastener of the mounting object section;
- (n) removing the strap from the quick release sections to detach the quick release sections from each other;
- (o) removing the first quick release section from the base section; and
- (p) removing the second quick release section from the mounting object section.

* * * * *